United States Patent
Namekawa et al.

(10) Patent No.: US 7,063,251 B2
(45) Date of Patent: Jun. 20, 2006

(54) POINT CARD, POINT CARD PROCESSING APPARATUS, AND POINT CARD SYSTEM

(75) Inventors: Nobuo Namekawa, Kanagawa (JP); Tetsuya Naruse, Chiba (JP); Masayuki Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 09/906,930

(22) Filed: Jul. 16, 2001

(65) Prior Publication Data

US 2002/0011517 A1    Jan. 31, 2002

(30) Foreign Application Priority Data

Jul. 18, 2000    (JP)    ............................. 2000-217863

(51) Int. Cl.
*G06F 17/00*    (2006.01)

(52) U.S. Cl. ...................... 235/375; 235/378; 235/487

(58) Field of Classification Search ................ 235/487, 235/375, 492, 378; 705/7, 26, 10
See application file for complete search history.

(56) References Cited

U.S. PATENT DOCUMENTS

| | | | |
|---|---|---|---|
| 5,594,493 A | | 1/1997 | Nemirofsky |
| 5,767,896 A | * | 6/1998 | Nemirofsky ................. 725/23 |
| 5,804,806 A | | 9/1998 | Haddad et al. |
| 5,812,942 A | * | 9/1998 | Allen et al. .................. 455/139 |
| 5,884,271 A | * | 3/1999 | Pitroda ............................. 705/1 |
| 5,992,888 A | * | 11/1999 | North et al. .................... 283/56 |
| 6,068,183 A | * | 5/2000 | Freeman et al. ............ 235/375 |
| 6,070,148 A | | 5/2000 | Mori et al. |
| 6,138,911 A | * | 10/2000 | Fredregill et al. ........... 235/383 |
| 6,321,208 B1 | * | 11/2001 | Barnett et al. ................. 705/14 |
| 6,419,161 B1 | | 7/2002 | Haddad et al. |
| 6,443,362 B1 | | 9/2002 | Methlouthi |
| 6,450,407 B1 | * | 9/2002 | Freeman et al. ............. 235/492 |
| 6,604,685 B1 | * | 8/2003 | Norton ........................ 235/492 |
| 6,611,814 B1 | * | 8/2003 | Lee et al. ....................... 705/26 |

FOREIGN PATENT DOCUMENTS

| | | |
|---|---|---|
| EP | 0 786 746 | 7/1997 |
| FR | 2 761 791 | 10/1998 |
| WO | WO 00 21020 | 4/2000 |
| WO | WO 00 38425 | 6/2000 |

\* cited by examiner

*Primary Examiner*—Daniel Stcyr
*Assistant Examiner*—Daniel A. Hess
(74) *Attorney, Agent, or Firm*—Frommer Lawrence & Haug LLP; William S. Frommer; Thomas F. Presson (57) ABSTRACT

A point card system according to the present invention includes a customer ID recording area 20, a service point recording area 24, an information recording area 22, and a browse flag recording area 23. The customer ID recording area 20 records unrewritable customer identification information. The service point recording area 24 records the number of service points. The information recording area 22 records provider information supplied from a provider without physical contacts. The browse flag recording area 23 records a history of provider information browsing. A provider 1 issues a wireless point card 3 to a customer 2. The provider 1 is provided with a wireless transceiver 8 and a card reader/writer 5. The system supplies provider information to the customer by radio and detects browse history information for providing an additional profit returning service.

19 Claims, 4 Drawing Sheets

POINT CARD, POINT CARD PROCESSING APPARATUS, AND POINT CARD SYSTEM

BACKGROUND OF THE INVENTION

1. Technical Field

The present invention relates to a point card for sequentially recording service points according to a consideration such as purchase of commodities and the like, a point card processing apparatus, and a point card system for processing this point card.

2. Prior Art

Department stores, large-scale stores, and the like employ a point card system as a profit returning service to specific customers. In the point card system, a store (provider) issues a point card to a registered customer. When the customer brings this point card and pays for purchased commodities or a paid service, specified service points equivalent to the consideration are provided and are recorded in the point card.

When the customer conducts next purchase of commodities and the like, the point card system provides a discount or an appropriate service according to the number of service points recorded in the point card. Since the provider can acquire various types of information about customers by using point cards, the point card system is very useful for effectively sending direct mail, for example. The point card system is also profitable to customers because there are offered various benefits such as profit returning services, discounts, and the like.

Presently, there are provided not only the above-mentioned point card, but also various cards such as bank cards, various prepaid cards, commuter passes, and the like. In many card systems, a card presented by the owner is loaded into a card reader/writer installed at the provider for recording or reproducing information and the like. Many card systems process specified operations by exchanging a card between the owner and the provider.

Card systems are intended for varieties of system evolutions and operations by using large-capacity, high-performance cards. For example, Japanese Patent Application Laid-Open No. 2000-11218, "wireless card system and control method thereof", discloses a railroad station system such as an automatic ticket checker using a wireless card having the wireless function. This system inspects tickets without the need to insert a card into the automatic ticket checker. According to this system, the wireless card functions not only as a commuter pass or a prepaid card, but also as a medium for storing guidance information which is provided by radio when the card passes the automatic ticket checker.

As mentioned above, the point card system is beneficial to both the provider and the customer. A conventional point card system uses customer identification information (ID information) recorded in a point card to collect marketing information such as a purchase history. Based on this information, the system is designed to operate by offering direct mail services, additional benefits, and the like.

It is very important for the provider to understand how the costly and time-consuming an advertisement actually has a direct effect on customers. To investigate an effect of the advertisement, for example, the provider sends direct mail to customers individually. When the customers visit the store and purchase commodities thereafter, the provider has little choice but to assume that the direct mail motivated customers to visit the store and purchase commodities. Based on this assumption, the provider drafts a plan for the next advertisement. However, it has been not always successful to create an efficient and effective advertisement satisfying customer needs.

A conventional point card system aims at customers who purchased commodities and the like. It is possible to obtain marketing information about when and what commodities a customer purchased. However, the conventional point card system could not acquire detailed information about, say, what information (advertisement) motivated the customers to visit the store. Such information can be collected by requesting the customers for a questionnaire or interviewing them. However, these works are labor-intensive. Further, it is difficult to acquire sufficiently accurate information.

Conventional point card systems provide almost the same contents. While a huge investment is required for developing the card processing software, introducing equipment such as a card reader, issuing cards, and the like, the advertising has a little impact on customers and is less effective. In the conventional system, the point card just functions as a medium for recording identification information about the customer and the number of points equivalent to a profit returning service offered from the provider.

BRIEF SUMMARY OF THE INVENTION

It is therefore an object of the present invention to provide a point card, a point card processing apparatus, and a point card system which inherit all advantages of the conventional point card system and create new and effective added values for both the provider and the customer.

In order to achieve the above-mentioned objects, a point card according to the present invention is issued from a provider to a specific customer and sequentially records service points provided according to considerations such as purchase of commodities, provision of paid services and the like, when the customer presents the point card to the provider and pays for the consideration. The point card comprises a customer identification information recording section for recording unrewritable customer identification information; a service point recording section for recording service points; and an information recording section for recording provider information such as an advertisement provided from a provider via a communication network. The point card is provided with a browse history recording section for recording a browse history information when provider information recorded in the information recording section is browsed.

When the thus configured point card according to the present invention is presented to the provider upon purchase of commodities and the like, a card reader/writer reads service points recorded in the service point recording section and records a newly provided service point. The point card uses the information recording section to record the provider information such as an advertisement provided from the provider via a communication network. Accordingly, the point card functions as a storage medium not only for service points, but also for advertisements and the like.

When the point card is browsed by appropriate reproduction means such as a card reader, the browse history recording section records the browse history information. When a service point is read or recorded, the browse history information is detected from the point card. Based on this browse history information, an additional profit returning service can be provided accordingly. The point card allows the provider to correctly determine whether the provider information is effectively viewed by customers. The point card allows the customer to receive useful provider information from the provider and obtain more benefits. The point card functions as a medium for provider information provided from the provider to the customer, constituting a new point card system with increased added values.

In order to achieve the above-mentioned objects, a point card processing apparatus according to the present invention comprises a card reader/writer for processing point cards and provider information transmission means. As mentioned above, the point card is issued from the provider to the specific customer and is presented by the customer who pays for a consideration such as purchase of commodities, provision of paid services and the like. The card reader/writer reads the recorded service point from the point card and records a newly provided service point in the point card. The provider information transmission means provides customers with provider information such as advertisements via a communication network and records this provider information in the point card.

The configured point card processing apparatus according to the present invention reads service points recorded by the card reader/writer in the point card presented by the customer and records a newly provided service point. The point card processing apparatus uses the provider information transmission means to provide information such as advertisements and records this information in the point card owned by the customer via a communication network. When the customer browses the provider information, the point card processing apparatus uses the card reader/writer to detect the browse history information recorded in the point card.

Based on the detected browse history information, the point card processing apparatus allows the provider to supply customers with additional services. The point card processing apparatus allows the provider to correctly determine whether the provider information is effectively viewed by customers. The point card processing apparatus allows the customer to receive useful provider information from the provider and obtain more benefits. The point card processing apparatus allows the point card to function as a medium for provider information provided from the provider to the customer, constituting a new point card system with increased added values.

In order to achieve the above-mentioned objects, a point card system according to the present invention uses a point card issued from the provider to a specific customer. The point card comprises a customer identification information recording section for recording unrewritable customer identification information, a service point recording section for recording the number of service points, and an information recording section for recording provider information provided from a provider. The point card is provided with the browse history recording section for recording browse history information when the customer browses the provider information recorded in the provider information recording section. The point card system is provided with an information provision apparatus and the card reader/writer. The information provision apparatus provides the provider with information comprising advertisements and the like via a communication network. The card reader/writer reads service points recorded in the point recording section from the point card represented by the customer and records a newly provided service point. The card reader/writer detects the browse history information recorded in the browse history recording section of the point card.

In the thus configured point card system according to the present invention, a customer presents a point card when paying for a consideration such as purchase of commodities, provision of paid services and the like. The card reader/writer at the provider side reads service points recorded in the point recording section of the presented point card and records a newly provided service point. According to this point card system, the provider uses provider information transmission means to provide customers with information such as an advertisement via a communication network. This provider information is recorded in the information recording section of the point card. Accordingly, the point card system allows the point card to function as a storage medium not only for service points, but also for advertisements and the like, improving added values.

When the customer browses the provider information in the point card system, the browse history information is recorded in the point card. The card reader/writer detects this browse history information concurrently with reading of service points. Based on the detected browse history information, the point card system allows the provider to supply customers with additional services. The point card system allows the provider to correctly determine whether the provider information is effectively viewed by customers. The point card system allows the customer to receive useful provider information from the provider and obtain more benefits. The point card system allows the point card to function as a medium for provider information supplied from the provider to the customer, constituting a new point card system with increased added values for the provider and the customer.

DETAILED DESCRIPTION OF THE INVENTION

Figure 1:
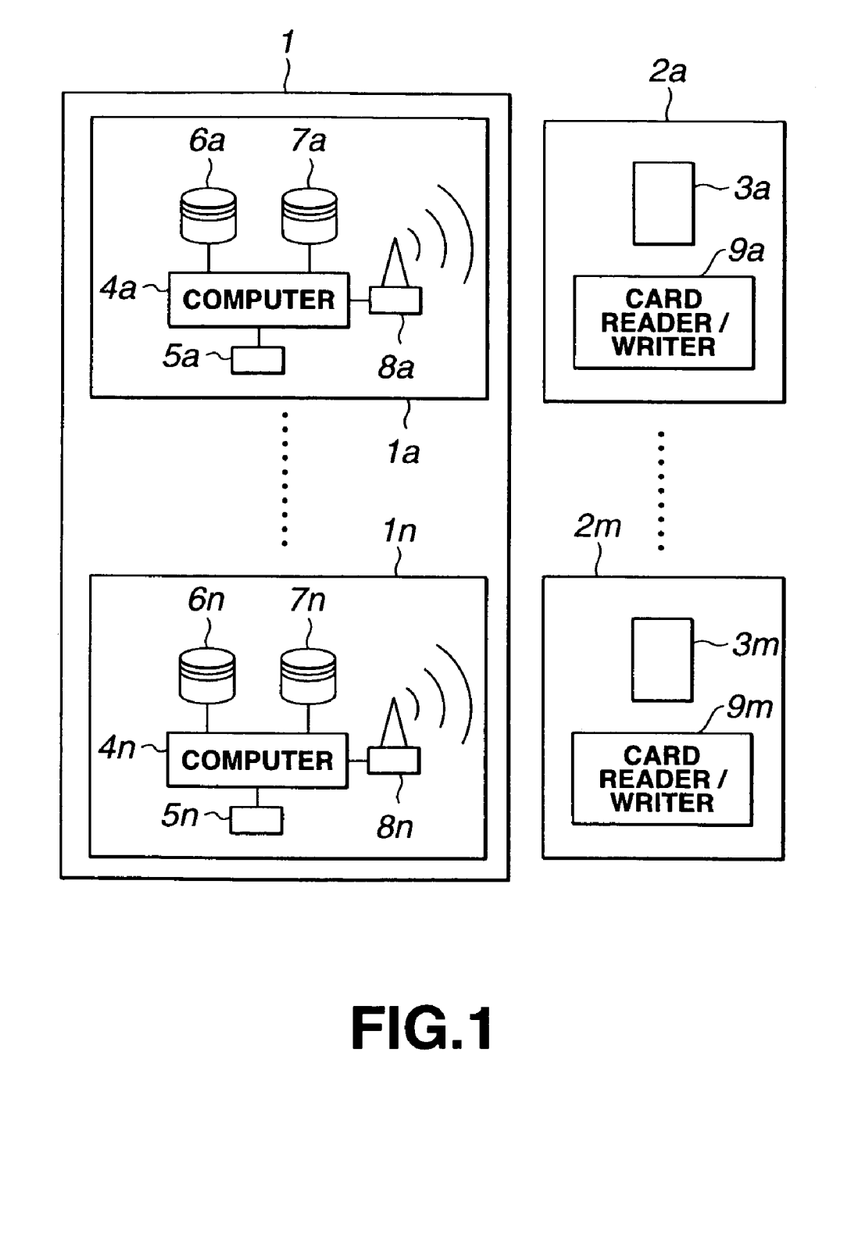
FIG. 1 shows a configuration of a point card system according to the present invention.

Embodiments of the present invention will be described in further detail with reference to the accompanying drawings. As shown in FIG. 1, a point card system comprises a plurality of providers 1 (1a to 1n) which provides commodities, paid services and the like (hereafter generically referred to as commodities and the like). These providers issue wireless point cards 3 (3a to 3m) to specific customers 2 (2a to 2m) who completed procedures such as applying for card issuance. In the point card system according to the present invention, like a prior art, when the customer shows the wireless point card 3 upon purchase of commodities and the like, the provider 1 records service points equivalent to the wireless point card 3.

In the point card system, the wireless point card 3 is issued to the customer 2 according to a procedure similar to that for the prior art. The point card system uses an application form submitted by the customer 3 to record personal information of the customer such as his or her name, address, birthday, age, sex, office, telephone number, family, and the like. After confirming the contents of the application form, the point card system issues the wireless point card 3 from the provider 1 to the customer 2. At this time, a customer ID is provided. As will be described later, the customer ID is recorded on the wireless point card 3 as information which cannot be rewritten by the provider 1 and the customer 2.

The point card system performs an application procedure for issuing the wireless point card 3 in the center at a time or at respective shops individually. When respective shops process application procedures individually in the point card system, the above-mentioned personal information is sent to the center and is managed in the database to be commonly used throughout the entire system.

As will be described later in detail, the wireless point card 3 of the point card system also functions as a storage medium for recording provider information such as an advertisement provided by the provider 1 via a wireless communication network. The point card system allows the customer 2 to determine whether to accept the information provided from the provider 1. When the customer 2 browses the provider information recorded in the wireless point card 3, the point card system enables benefits such as adding service points from the provider 1 upon purchase of commodities and the like. Accordingly, the point card system allows the provider 1 to easily provide the customer 2 with information and also permits the customer 2 to more efficiently browse the provider information.

As shown in FIG. 1, the point card system provides the providers 1 with management control computers 4 (4a to 4n), card reader/writers 5 (5a to 5n) for reading and recording service points in the wireless point card 3, customer databases 6 (6a to 6n) for storing information about customers 2, information databases 7 (7a to 7n) for managing information provided to the customers 2, and wireless transceivers 8 (8a to 8n). Though not shown in the figure, the provider 1 is provided with a cash register for recording and totaling sales amounts, a monitor for displaying information output from the card reader/writer 5, and the like.

The above-mentioned point card system provides each provider 1 with the customer database 6 and information database 7. It may be preferable to manage these databases at the center in a centralized manner. In this case, the point card system is so configured that the center is connected to each provider 1 via an appropriate communication network and specific customer information and provider information are mutually transmitted via the computer 4.

The computer 4 connects the above-mentioned apparatuses constituting the point card system with each other and controls operations thereof. It may be preferable to use a host computer responsible for providing the POS function such as managing sales at the shops or processing employee data such as arrival and departure times and salaries. The computer 4 uses the card reader/writer 5 to receive various information recorded in the wireless point card 3. The computer 4 inputs specified information to the card reader/writer 5 to record the corresponding information in the wireless point card 3. The computer 4 inputs items in the application form submitted from the customer 2 and registers the corresponding information in the customer database 6 to be described later.

When the card reader/writer 5 is loaded with the wireless point card 3 of the customer 2, it reads the recorded ID information and service points. The card reader/writer 5 can be built in, say, a cash register. The card reader/writer outputs the above-mentioned information along with sales information such as prices, commodity names, dates, and times to the computer 4.

The customer database 6 stores information registered for each customer 2 with the corresponding ID information when the wireless point card 3 was issued and information about past purchase of commodities. Each time the customer 2 purchases commodities and the like, the customer database 6 stores the corresponding information as new information via the computer 4. It may be preferable to allow the center to manage the customer database 6 as a shared database in a centralized manner, or supply each provider 1 with the customer database as original data.

When the card reader/writer 5 reads ID information recorded in the wireless point card 3, customer information is retrieved from the customer database 6 based on an instruction of the computer 4 and is displayed on a monitor and the like. The provider 1 can use individual information for each customer 2 stored in the customer database 6 to create specific provider information and supply it to the corresponding customer 2.

The information database 7 stores data about the provider information. As will be described later, when the card reader/writer 5 detects a browse flag for the provider information recorded in the wireless point card 3, the browse flag is collated with stored data based on an instruction of the computer 4. The provider information comprises each provider 1, its shops, an advertisement of goods, bargain announcement, and the like, and includes information created by each provider 1 as well as common information. Further, the provider information includes various questionnaires and valid dates for browsing.

The wireless transceiver 8 complies with, say, Bluetooth system specifications for short-range wireless communication systems capable of relatively easily and economically configuring systems. The wireless transceiver 8 can record provider information in the wireless point card within the range of approximately 10 m without physical contacts. The wireless transceiver 8 transmits the provider information retrieved from the information database 7 based on an instruction of the computer 4. Since an antenna of the wireless transceiver 8 is stationed at the shop's entrance or near the cashier, the provider information is recorded in the wireless point card 3 of the customer 2 who comes to the shop or purchases commodities and the like without drawing customer's attention. The wireless transceiver 8 also records the provider information in the wireless point card 3 of the window-shopping customer 2 outside the shop. Obviously, the point card system is not only used for the above-mentioned wireless communication system, but also is applied to the other wireless communication systems.

The point card system also provides the users 2 with card reader/writers 9 (9a to 9m) for reading service points, provider information, and the like recorded in the wireless point cards owned by the customers and recording necessary information in each wireless point card. The customer 2 is also provided with a monitor and the like for outputting information read from the wireless point card 3 by the card reader/writer 9. It may be preferable to use, say, a personal computer having a card processing capability in addition to, or instead of the card reader/writer 9 for processing the wireless point card 3 as mentioned above.

When the customer shows the wireless point card 3 upon purchase of commodities and the like in the point card system, the provider 1 provides the customer 2, on request, with a profit returning service according to the number of service points recorded in the wireless point card 3. The profit returning service includes giving a discount at the rate equivalent to the number of service points, offering special services or premiums, and the like. When the profit returning service is provided, the point card system subtracts the number of service points from the wireless point card 3 and adds the number of service points newly added according to the purchase.

At the request of the customer 2, the point card system adds the number of newly acquired service points to the number of service points recorded in the wireless point card 3. When the customer 2 browses the provider information recorded in the wireless point card 3, the point card system provides additional service points as will be described later. As mentioned above, the provider information also includes questionnaires to which the customer 2 does not easily respond. The point card system may provide a high additional service point for a response to such questionnaires.

Figure 2:
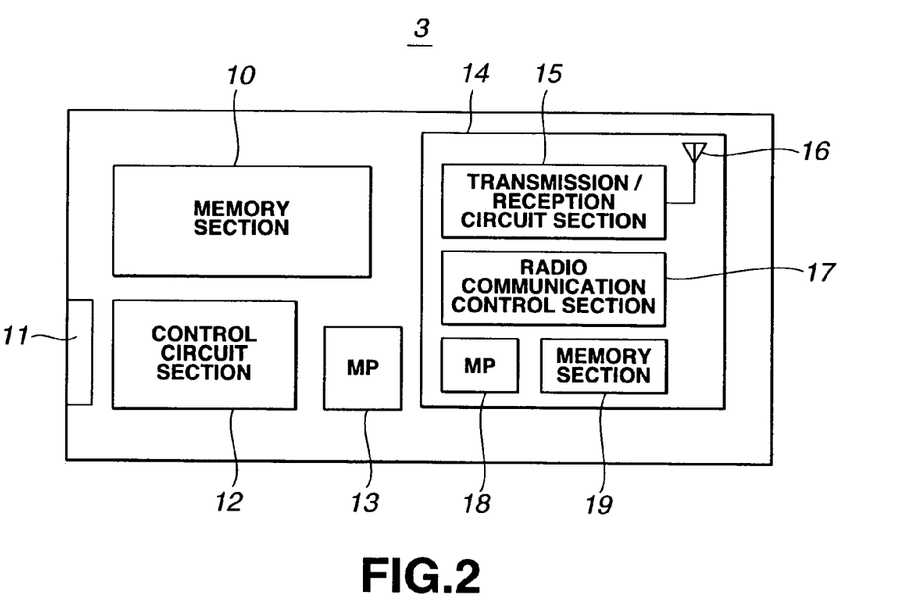
FIG. 2 shows a configuration of a wireless point card used for the point card system.

The point card system uses the wireless point card 3 among a plurality of providers 1. As will be described later in detail, the wireless point card uses a specified format and is capable of rewriting recorded information without physical contacts. As shown in FIG. 2, the wireless point card 3 is provided with a memory section 10, a read/write connector section 11, a control circuit section 12, a microprocessor 13, and a wireless communication module (Bluetooth module) 14. The wireless communication module 14 is provided with a transceiver circuit section 15, a built-in antenna 16, a wireless communication (Bluetooth) control circuit section 17, a wireless control microprocessor 18, and a wireless memory section 19 for its work area. The wireless point card 3 used is a so-called battery-less wireless card which generates necessary power inside using, say, a communication wave.

The memory section 10 includes a work area used for processing of the microprocessor 13 and stores ID information, the number of service points, and the like given to the customer 2, as will be described later in detail. The read/writer connector section 11 functions for recording and reproducing information from the wireless point card 3 through the use of physical contacts. The read/writer connector section 11 records and reproduces information, for example, when the wireless point card 3 is attached to the card reader/writer 5 of the provider 1 or the card reader/writer 9 of the customer. The control circuit section 12 and the microprocessor 13 provide such hardware control for the entire wireless point card 3 as in recording information in the memory section 10, reading recorded information, or receiving information to be provided.

The communication module 14 is provided in a chip and is mounted on a printed circuit card. The transceiver circuit section 15 processes information received at the built-in antenna 16. The communication module 14 uses the transceiver circuit section 15 to transmit the information from the built-in antenna 16. The communication module 14 uses the wireless communication control circuit section 17 to modulate and demodulate information to be transmitted or received. The wireless control microprocessor 18 controls the entire communication module 14.

Figure 3:
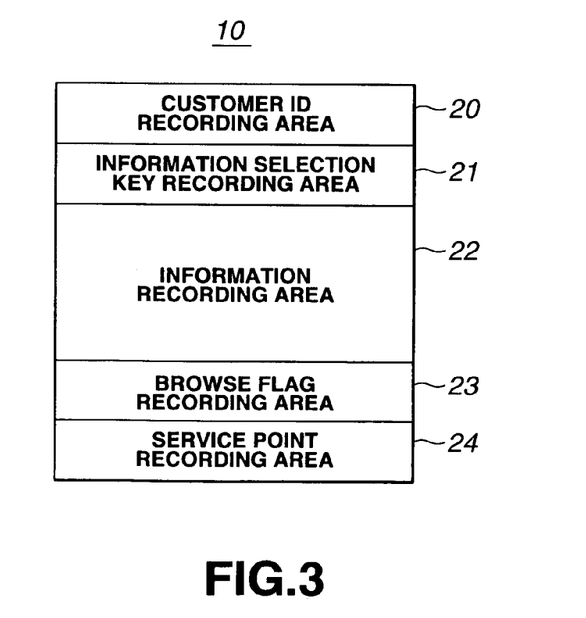
FIG. 3 shows a configuration of a memory section used for the wireless point card.

As shown in FIG. 3, the memory section 10 of the wireless point card 3 contains a customer ID recording area 20, an information selection key recording area 21, an information recording area 22, a browse flag recording area 23, a service point recording area 24, and the like. The customer ID recording area 20 records ID information provided when the provider 1 issues the wireless point card 3 based on a request from the customer 2. The provider 1 or the customer 2 cannot modify the ID information once recorded in the wireless point card 3. The provider 1 and the customer 2 can read the ID information. From the viewpoint of security, however, it may be preferable to disable the customer from reading the ID information for preventing unauthorized use by a third party when the card is lost.

The wireless point card 3 also records information unneeded for the customer 2 via a wireless communication network in the limited information recording area 22, disabling necessary provider information from being recorded. To solve this, an information selection key is recorded in the wireless point card 3. The customer 2 records this key in the information selection key recording area 21 for determining whether to receive information provided from the provider 1 or for selecting the type of information.

The information selection key is recorded by using the card reader/writer 9 or a personal computer owned by the customer 2. The customer 2 can rewrite the information selection key as needed. However, the provider 1 cannot rewrite the information selection key. Of course, the provider 1 and the customer 2 can read the information selection key. For example, the information selection key is used for setting a condition of advertisement information intended to be acquired. However, input operations are inconvenient when storing words. Further, conforming technical terms and retrieving information are time-consuming.

In the point card system, for example, the provider 1 distributes a code list and the like to the customer 2 when issuing the wireless point card 3. Based on this code list, the intended shop code information is entered to be used an information selection key. For example, a shop name list is already recorded in the information selection key recording area 21 of the wireless point card 3. This list may contain mark information as an information selection key which is checked for an intended shop name when the list is called. When the point card system is used for a large-scale shop, information selection keys may indicate merchandise categories such as food, clothing, household goods, and the like.

The information recording area 22 stores information provided from the provider 1 via a wireless communication network without physical contacts. The provider information relates to guidance or an advertisement of each shop, an advertisement of goods, and other various types of information. The provider information is selected and recorded within the range of acquisition conditions specified by the above-mentioned information selection keys. Each provider information is given a code. Since the provider information is recorded in the limited information recording area 22, the size and the format are predetermined. When the provider information is applicable for a limited period like bargain information, for example, the valid period information is added as header information.

At the expiration of the valid period, the provider information is automatically deleted from the information recording area 22 for effective use of this area. When the customer 2 browses the provider information using the card reader/writer 9 as will be described later, the valid period information is checked for automatic deletion. When the provider 1 supplies new information, the provider information is checked for its valid period information and is deleted automatically or is overwritten. The customer 2 can read, but cannot record the provider information. The provider 1 can record and read the provider information.

When the customer 2 browses the provider information and determines it to be unnecessary, the wireless point card 3 may be operated to erase unnecessary information for effective use of the information recording area 22. In this case, the wireless point card is configured so as to leave a browse flag to be effective. As mentioned above, the wireless point card 3 is readable by the provider. Accordingly, for example, the wireless point card 3 is configured so that the provider 1 can determine to inhibit additional recording or enable overwriting when the information recording area 22 is full.

The browse flag recording area 23 records a browse flag corresponding to each provider information when the card reader/writer 9 is used for browsing the provider information from the provider 1 as will be described later in detail. Neither the provider 1 nor the customer 2 can intentionally record or delete the browse flag. The software records this flag based on browse operations. An example of the browse flag is code information of the browsed provider information recorded in the browse flag recording area 23. As will be described later, the provider 1 confirms the browse flag. When a profit returning service is provided, the browse flag is deleted along with the code information. The browse flag is recorded in the browse flag recording area 23 preferably when the customer reads all the provider information or when the customer reads the provider information for a specified time.

The service point recording area 24 records the number of service points processed during the previous purchase of commodities and the like. When commodities and the like are purchased, the card reader/writer 5 of the provider 1 records the above-mentioned service points in the service point recording area 24.

Figure 4:
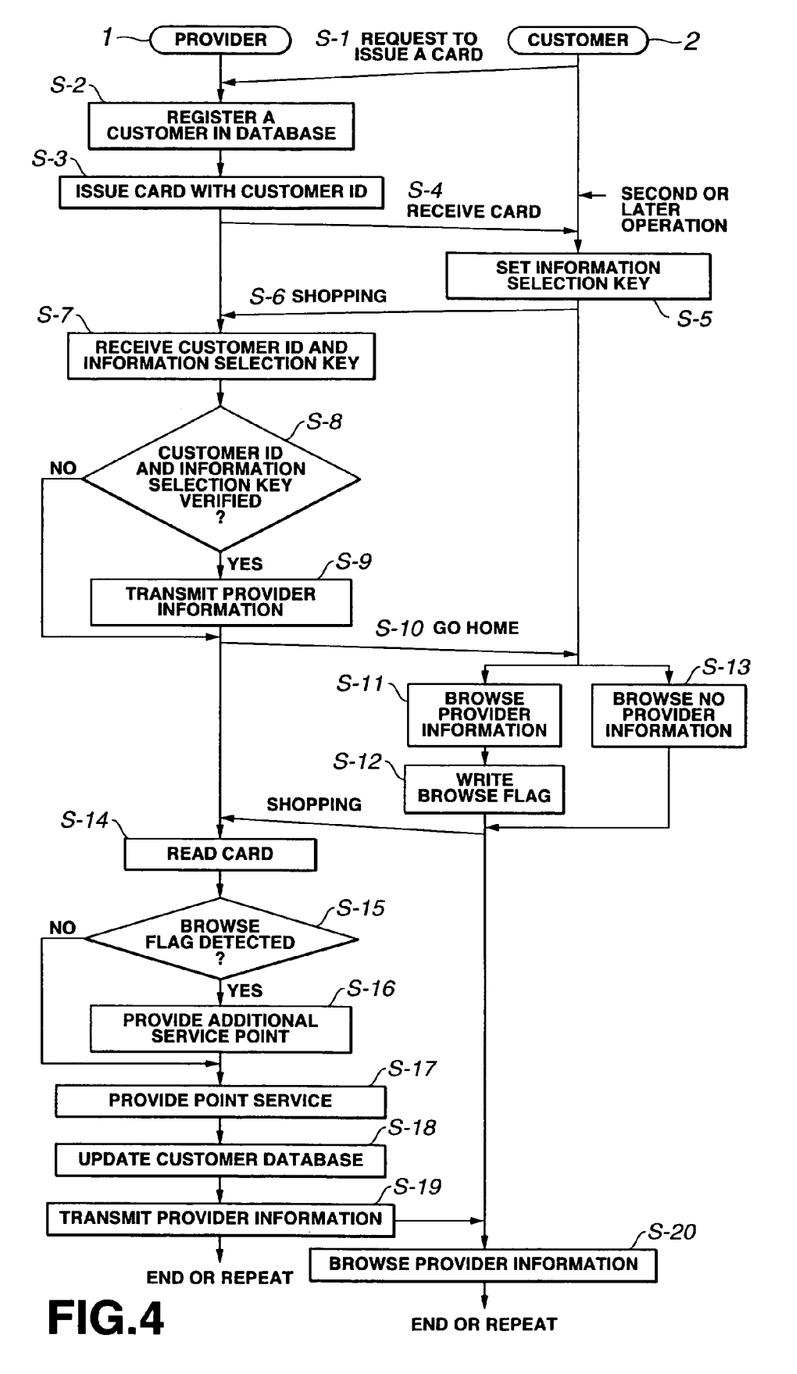
FIG. 4 shows a flowchart concerning operations of the point card system.

The following describes operations of the above-mentioned point card system with reference to the flowchart in FIG. 4. In the point card system, the customer 2 applies to the provider 1 for the wireless point card 3 (s-1). In the point card system based on this application, the provider 1 creates customer data and registers it in the customer database 6 (s-2). Based on the customer registration by the provider, the point card system assigns a specific customer ID to the corresponding customer 2 and issues the wireless point card 3 recording this customer ID (s-3). The wireless point card 3 is immediately issued or mailed to the customer 2 (s-4).

For acquiring necessary provider information in the point card system, the customer 2 sets an information selection key using the card reader/writer 9. The information selection key is recorded in the information selection key recording area 21 of the wireless point card 3 (s-5). For shopping in the point card system, the customer 2 brings the wireless point card 3 (s-6). When the customer visits or window-shops at a store of the provider 1, the wireless transceiver 8 receives the customer ID and the information selection key transmitted from the wireless point card 3 (s-7). It is apparent that the point card system identifies the valid period given to the provider information and prevents recording of the expired provider information.

The point card system uses the computer 4 to input the customer ID information received by the wireless transceiver 8. The customer ID information is collated with that stored in the customer database 6. Further, the information selection key information received by the wireless transceiver 8 is input to the computer 4 and is collated with the provider information stored in the information database 7 (s-8).

According to this collation operation, the point card system determines whether to enable the provider information to be written in the wireless point card 3 of the customer 2. When the writing is enabled, the provider information is retrieved from the information database 7. This provider information is transmitted to the wireless point card 3 from the wireless transceiver 8. The wireless point card 3 receives the provider information using the built-in antenna 16 and records it in the information recording area 22 of the memory section 10 (s-9). Even if the customer 2 does not purchase commodities and the like in the point card system, desired provider information from the provider 1 is recorded in the wireless point card 3. The customer takes this wireless point card 3 home (s-10).

When the customer 2 needs to browse the provider information recorded in the wireless point card 3, the customer loads the wireless point card 3 into the card reader/writer 9 (s-11). This browse operation records a browse flag in the wireless point card 3 (s-12). The browse flag corresponds to each provider information in the browse flag recording area 23 of the memory section 10. No browse flag is recorded in the wireless point card 3 when the customer 2 does not browse the provider information (s-13). The point card system determines the valid period of the provider information and does not display expired provider information.

In the point card system, the customer visits a store of the provider 1, purchases commodities and the like, pays for the purchase, and shows the wireless point card 3. The wireless point card 3 is loaded into the card reader/writer 5 for reading data (s-14). During this read operation, service points equivalent to the payment are recorded in the wireless point card 3. The card reader/writer 5 determines whether the wireless point card 3 contains a browse flag in the browse flag recording area 23 (s-15). Based on this browse flag detection, the specified number of service points are added to the wireless point card 3 for cumulative recording (s-16).

When the customer 2 requests to use the number of accumulated service points, the point card system provides given services such as a discount for the number of service points, and the like (s-17). When no browse flag is detected in the wireless point card 3, the point card system offers a profit returning service corresponding to the number of recorded service points.

The above-mentioned purchase information about commodities and the like of the customer 2 is output from the card reader/writer 5 to the computer 4 and is stored as new information in the customer database 6 to update the database (s-18). In the same manner as the above-mentioned processing, the wireless transceiver 8 transmits new provider information to the wireless point card 3. The wireless point card 3 uses the built-in antenna 16 to receive the new provider information and records it in the information recording area 22 of the memory section 10 (s-19).

After getting home, the customer 2 uses the card reader/writer 9 to confirm the remaining service points and browses the newly recorded provider information (s-20). This browse operation records the browse flag in the wireless point card 3. In the point card system, the above-mentioned operations are repeated to provide service points for the purchase of commodities and the like and those for the provider information browsing. The provider 1 offers a profit returning service to the customer 2.

The point card system records information provided from the provider 1 in the wireless point card 3 owned by the customer 2 via a wireless communication network without physical contacts. The wireless point card 3 for the point card system functions not only as a recording medium for service points, but also as a recording medium for provider information such as an advertisement, improving added value. When the customer effectively browses the provider information, the provider 1 adds the specified number of service points. Accordingly, the point card system allows the customer to receive useful information from the provider and provides the customer with more benefits by means of provider information browsing. A high value-added new system can be constructed for the provider 1 and the customer 2.

Figure 5:
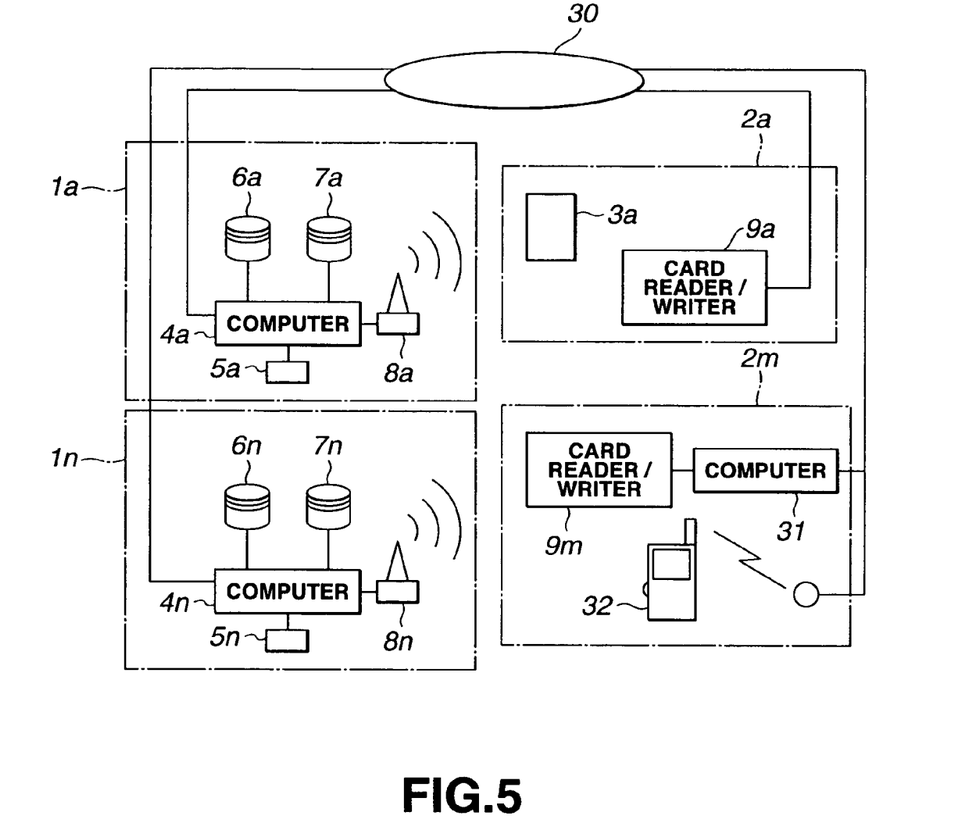
FIG. 5 shows a configuration of another point card system.

In the above-mentioned point card system, the provider 1 uses the wireless communication network to transmit the provider information to the wireless point card 3 owned by the customer 2. When the customer 2 browses the provider information, the card reader/writer 9 records the browse flag. The present invention is not limited to this point card system. The present invention is also applicable to a system shown in FIG. 5 as the second embodiment. The point card system in FIG. 5 provides information using a public communication network as well as the wireless communication network.

Namely, this point card system connects the computer 4 for each provider 1 and the card reader/writer 9 or a personal computer 31 for the customer 2 to the public communication network represented by an Internet network 30. When the customer database 6 and the information database 7 are shared throughout the point card system, it may be preferable to provide interconnection with a center host computer, say, by means of a LAN. The apparatus configuration of the provider 1 for this point card system is same as that for the point card system according to the first embodiment. Therefore, the same apparatuses are depicted by the same reference numerals and a detailed description is omitted for simplicity.

This point card system provides the basic mode in which the provider 1 uses the wireless transceiver 8 to transmit provider information to the wireless point card 3 owned by the customer 2. Though this basic mode is same as that for the above-mentioned point card system, the mode of providing the provider information is characteristic of the second embodiment. In the point card system, the provider provides the customer 2 with provider information not in full text. The provider information is recorded as an identification number for each individual information in the wireless point card 3. As an alternative to transmit the provider information, it may be preferable to transmit individual information's header information, summary information, and the like to the wireless point card 3.

After getting home, the customer 2 loads the wireless point card 3 into the card reader/writer 9. The point card system verifies the provider information's identification number. An attempt is made to retrieve the text of the provider information from the information database 6 via the Internet network 30. According to this operation, the point card system records the browse flag in the wireless point card 3.

When the card reader/writer 9 to be used has the communication function, the point card system is ineffective with respect to operability, connect ability to lines, cost effectiveness, and the like. It is possible to connect this card reader/writer 9 as a terminal of the computer 31. The point card system provides the computer 31 with a function for connecting to the Internet network 30 and facilitates input processing for information retrieval keys. When the card reader/writer 9 reads the provider information's identification number information in this point card system, the identification number information is input to the computer 31. Based on this identification number information, the system accesses the information database 6 via the Internet network 30 and obtains the provider information's text. The point card system accesses the information database 6 to record the browse flag in the wireless point card 3 by using the card reader/writer 9.

The point card system records service points and the provider information in the wireless point card 3 having the wireless communication function. It may be preferable to implement this function by using, say, a portable telephone 32. The point card system may be configured so that the portable telephone 32 substitutes for the wireless point card 3. For example, the point card system accesses the information database 6 via the Internet network 30 based on the identification number information recorded in the wireless point card 3. At this time, the portable telephone 32 is capable of connection to the card reader/writer 9 or the computer 31.

What is claimed is:

1. A point card which is issued from a provider to a specific customer, that records service points, said point card comprising:
   wireless transmission/reception means for transmitting and receiving signals;
   a power generating means for generating power, from a communication wave, for said point card;
   a memory;
   a customer identification information recording section in said memory for recording customer identification information;
   a service point recording section for recording said service points;
   a provider information recording section for recording provider information, provided by a provider, said provider information indicating available merchandise, a time period for the available merchandise and the provider information being responsive to customer selection data, the customer selection data indicative of desired merchandise and the customer selection data being transmitted, from the specific customer, to one or more providers; and
   a browse history recording section for recording browse history information when provider information recorded in said provider information recording section is browsed by a display which is connected with a wireless card reader/writer via said wireless transmission/reception means,
   wherein when the point card is presented to a provider upon purchase of commodities, said service points recorded in said service point recording section are read out, said browse history information recorded in said browse history recording section is detected and a specified profit returning service based on the recorded service points and browse history information is presented.

2. The point card according to claim 1 further comprising:
   a wireless reception section for receiving said provider information transmitted via a wireless communication network and for supplying said provider information to said provider information recording section.

3. The point card according to claim 1 further comprising:
   a record control section for determining whether to record all or part of said provider information in said provider information recording section.

4. The point card according to claim 1 further comprising:
   a wireless transmission and reception means and a display device for displaying at least one of received information and provider information recorded in said provider information recording section.

5. The point card according to claim 1, wherein expiration processing is performed when valid period information attached to said provider information is detected in browsing provider information or recording new provider information.

6. A point card processing apparatus for use with a point card which is issued from a provider to a specific customer, said point card processing apparatus comprising:
- a card reader/writer for reading customer identification information from a customer identification information recording section in a memory of said point card, reading recorded service points, and recording a newly provided service point; and
- provider information transmission means for providing said point card with provider information via a communication network,
- wherein the provider information is indicative of available merchandise and a time period for the available merchandise, the provider information written onto the card in response to customer selection, the customer selection data indicative of merchandise desired by said customer and the customer selection data transmitted, from the specific customer, to one or more providers,
- wherein said reader/writer reads said recorded service points from said point card presented by the specific customer and detects browse history information recorded when the specific customer browses said provider information,
- wherein when the specific customer presents said point card to a provider upon purchase of commodities, said recorded service points are read out, said browse history information is detected, and a specified profit returning service based on the recorded service points and browse history information is presented,
- whereby said point card is operable to receive a communication wave for generating power for said point card.

7. The point card processing apparatus according to claim 6 further comprising:
- a customer management information storage section for recording management information about a customer, which sequentially records information about customer's purchase, and sequentially records information about provider information based on said browse history information read by said reader/writer.

8. The point card processing apparatus according to claim 7, wherein said customer management information storage section based on recording information provides a specific customer with specific provider information by means of said provider information transmission means.

9. The point card processing apparatus according to claim 6, wherein said point card processing apparatus includes a wireless transmission means and provides a wireless point card having a wireless reception section with said provider information from said provider information transmission means.

10. A point card system comprising:
- a point card issued from a provider to a specific customer having a power generating means for receiving a communication wave and for generating power for said point card, a memory, a customer identification information recording section in said memory for recording unrewritable customer identification information, a service point recording section for recording service points, a browse history recording section for recording browse history information and a provider information recording section for recording provider information provided from a provider;
- an information provision apparatus for providing said provider with said provider information via a communication network; and
- a card reader/writer for reading said service points recorded in said service point recording section and recording a service point newly-added according to a consideration with respect to said point card presented by a customer upon purchase of commodities,
- wherein said information recording section of said point card records said provider information provided from said provider to a customer responsive to customer selection data, the information provided by the provider indicating available merchandise and a time period for the available merchandise, the customer selection data indicative of product information desired by said customer and the customer selection data being transmitted, from the specific customer, to one or more providers,
- wherein when said point card is presented to a provider upon purchase of commodities, said service points recorded in said service point recording section are read out, said browse history information recorded in said browse history information recording section is detected and a specified profit returning service based on the recorded service points and browse history information is presented.

11. The point card system according to claim 10,
- wherein said point card is provided with browse history information recording section for recording browse history information when said provider information recorded in said provider information recording section is browsed; and
- wherein said provider provides a customer with an additional service when said card reader/writer detects said browse history information.

12. The point card system according to claim 10,
- wherein said point card system uses a wireless point card having a wireless reception section for receiving said provider information transmitted via a wireless communication network and supplying said provider information to said information recording section; and
- wherein a provider is provided with a wireless transmission apparatus for providing said provider information from said information provision apparatus via a wireless communication network.

13. The point card system according to claim 12,
- wherein said provider information comprises header information and text information;
- at least said header information is supplied to said wireless point card from said information provision apparatus via said wireless transmission apparatus and said text information is supplied to a terminal apparatus accessing said information provision apparatus based on this header information via a communication network; and
- said browse history information is recorded in said browse history recording section according to provision of said text information.

14. The point card system according to claim 12, wherein said point card system uses a point card having a wireless transmission means, reception means, and a display device for displaying received information and provider information recorded in said provider information recording section.

15. The point card system according to claim 10, wherein a terminal apparatus at the customer side enables an access to said information provision apparatus at the provider side via a communication network.

16. The point card system according to claim 10, wherein said point card system uses a point card having a record control section for determining whether to record all or part of said provider information in said provider information recording section.

17. The point card system according to claim 10,
wherein said point card system uses a point card which checks a valid period during a browse operation for said provider information and prevents reproduction of said provider information when the valid period expires; and
wherein said additional service processing is performed only when provider information is browsed during a valid period.

18. The point card system according to claim 10,
wherein a provider is provided with a customer management information storage apparatus for recording management information about a customer; and
wherein said customer management information storage apparatus sequentially records information about customer's purchase and the like, and sequentially records information about provider information based on said browse history information read by said reader/writer.

19. The point card system according to claim 18, wherein said provider information transmission apparatus creates specific provider information based on information about a specific customer recorded in said customer management information storage apparatus, and a provider provides said specific customer with said specific provider information.

* * * * *